UNITED STATES PATENT OFFICE.

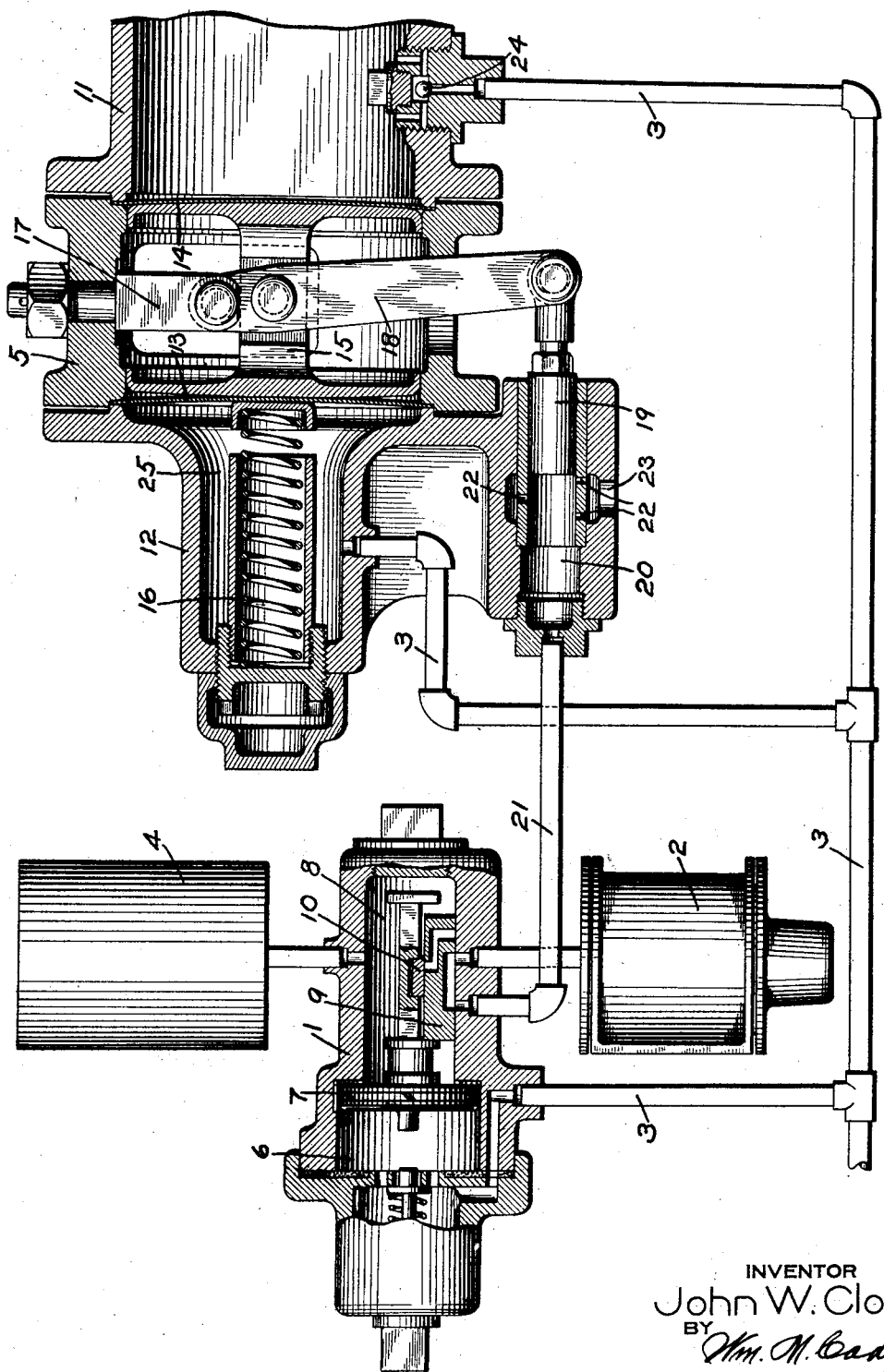

JOHN W. CLOUD, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,403,846.  Specification of Letters Patent.  Patented Jan. 17, 1922.

Application filed November 22, 1919. Serial No. 340,016.

*To all whom it may concern:*

Be it known that I, JOHN W. CLOUD, a subject of the King of Great Britain, and resident of London, England, have invented a certain new and useful Improvement in Fluid-Pressure Brakes, of which the following is a specification.

This invention relates to fluid pressure brakes, and has for its principal object to provide improved means for effecting the graduated release of the brakes.

In the accompanying drawing, the single figure is a diagrammatic view, mainly in section, of a car fluid pressure brake equipment embodying my invention.

As shown in the drawing, the equipment may comprise a triple valve device 1, a brake cylinder 2, brake pipe 3, an auxiliary reservoir 4 of the usual construction, and according to my invention, a valve mechanism 5 for graduating the release of the brakes.

The triple valve device 1 comprises a casing, having a piston chamber 6 connected to the brake pipe 3 and containing a piston 7, and a valve chamber 8 connected to the auxiliary reservoir 4 and containing the usual main slide valve 9 and graduating valve 10 adapted to be operated by piston 7.

The valve device 5 for graduating the release of the brakes may comprise a main casing having a reservoir 11 secured thereto at one side and a casing 12 secured at the opposite side.

Within the main casing are mounted diaphragms 13 and 14 connected by a stem 15, the diaphragm 14 being subject to the pressure in reservoir 11 and the other diaphragm to the pressure of fluid in the brake pipe 3 and a coil spring 16.

A lug 17 is secured to the main casing and pivoted to said lug is a lever 18, the opposite end of which is pivotally connected to a valve member 19.

At an intermediate point, the lever 18 is pivotally connected to the stem 15, so that the movement of the diaphragms 13 and 14 is adapted to operate the valve member 19.

Chamber 20, in which the valve member 19 operates, is connected by pipe 21 to the triple valve exhaust port and ports 22 leading from said chamber to an atmospheric exhaust port 23 are controlled by the movement of said valve member.

In operation, the brake pipe 3 being charged with fluid under pressure, the reservoir 11 is also charged past the check valve 24, as well as the chamber 25.

Normally, there being brake pipe pressure in reservoir 11 and chamber 25, the differential pressure of spring 16 acts to move the diaphragms 13 and 14 toward the reservoir 11, so that valve member 19 is operated through lever 18 to uncover the ports 22, thereby permitting free communication from the triple valve exhaust port to the atmosphere.

Upon reducing the pressure in the brake pipe 3 to effect an application of the brakes in the usual manner, the pressure in chamber 25 is correspondingly reduced, while the pressure in reservoir 11 is maintained, since the check valve 24 prevents back flow from the reservoir to the brake pipe.

The pressure of spring 16 is then overcome by the higher fluid pressure in reservoir 11, so that the diaphragms 13 and 14 are shifted toward the casing 12, thereby causing the lever 18 to move the valve member 19 so as to close the ports 22.

If it is desired to effect a graduated release of the brakes, the brake pipe pressure is gradually increased to cause the usual movement of the triple valve piston 7 to release position. Fluid is then released from the brake cylinder 2 and flows to chamber 20.

The partial increase in brake pipe pressure together with the pressure of fluid from the brake cylinder acting on the valve member 19 causes the movement of diaphragms 13 and 14 so as to shift the valve 19 and open the ports 22, permitting the release of fluid from the brake cylinder.

When the brake cylinder pressure has been reduced by flow to the atmosphere to a predetermined degree, the pressure in reservoir 11 will overcome the combined pressures of the spring 16, the reduced brake pipe pressure in chamber 25, and the brake cylinder pressure on valve member 19, so that the diaphragms 13 and 14 will move the lever 18 and valve member 19 so as to close the ports 22 and prevent the further exhaust of fluid from the brake cylinder.

The brake cylinder pressure may be further reduced by making a further increase in brake pipe pressure which will obviously cause the apparatus to again operate in the same manner as hereinbefore described.

It will be evident that the inward movement of the valve 19 to cut off communication from the triple valve exhaust to the atmosphere will be determined by the pressure obtaining in the brake cylinder, the pressure obtaining in the brake pipe, and the strength of the spring 16, so that the pressure retained in the brake cylinder will be proportional to the value of the restored pressure in the brake pipe, relative to the standard brake pipe pressure obtaining in the reservoir 11, and a graduated release of the brakes proportional to the extent of the restoration of the brake pipe pressure after a reduction therein, causing an application of the brakes, can be obtained.

Having now described my invention, what I claim as new, and desire to secure by Letters Patent, is:—

1. In a fluid pressure brake, the combination with a brake pipe and brake cylinder, of a valve device having a movable abutment subject on one side to the pressure in the brake pipe and on the opposite side to fluid at the normal brake pipe pressure and means operated by said abutment for controlling the release of fluid from the brake cylinder.

2. In a fluid pressure brake, the combination with a brake pipe and brake cylinder, of a valve device having a movable abutment subject on one side to the pressure in the brake pipe and on the opposite side to fluid at the normal brake pipe pressure and means operated by said abutment and subject to brake cylinder pressure for controlling the release of fluid from the brake cylinder.

3. In a fluid pressure brake, the combination with a brake pipe and brake cylinder, of a valve device having a movable abutment subject on one side to the pressure in the brake pipe and the pressure of a spring and on the opposite side to the normal brake pipe pressure and valve means operated by said abutment for controlling the release of fluid from the brake cylinder and subject to brake cylinder pressure tending to open the exhaust from the brake cylinder.

4. In a fluid pressure brake, the combination with a brake pipe and brake cylinder, of a valve device having a movable abutment subject on one side to the pressure in the brake pipe and the pressure of a spring and on the opposite side to the pressure of a reservoir adapted to be charged from the brake pipe, a check valve for preventing back flow from the reservoir to the brake pipe, and valve means operated by said abutment for controlling the release of fluid from the brake cylinder.

5. In a fluid pressure brake, the combination with a brake pipe, brake cylinder, and triple valve device, of a valve mechanism for controlling the release of fluid from the brake cylinder through the triple valve exhaust port, comprising valve means for controlling the triple valve exhaust port and subject to brake cylinder pressure tending to open the valve and a movable abutment subject on one side to brake pipe pressure and the pressure of a spring tending to open the valve and on the opposite side to the pressure of a reservoir adapted to be charged from the brake pipe and tending to close the valve means.

In testimony whereof I have hereunto set my hand.

JOHN W. CLOUD.